United States Patent Office 3,512,341
Patented May 19, 1970

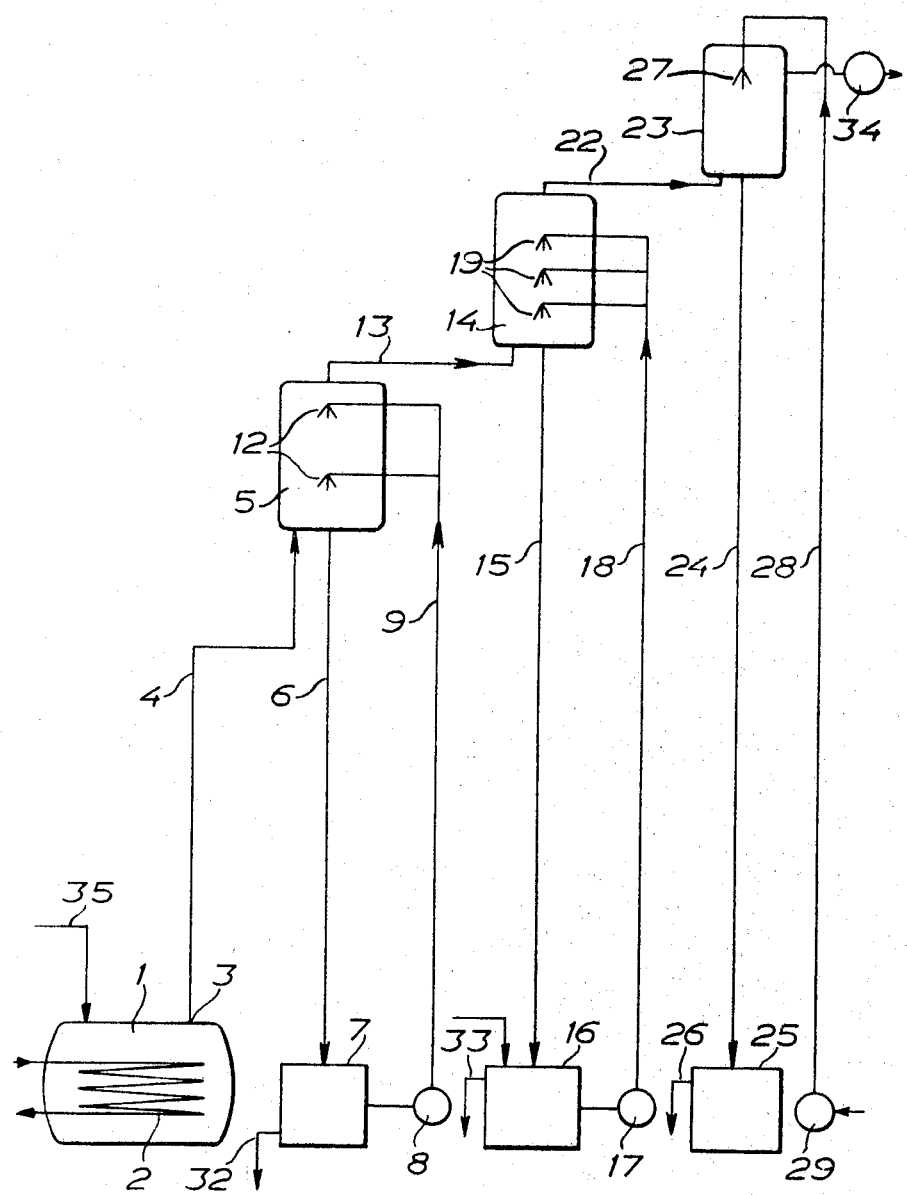

3,512,341
PURIFICATION OF VAPOURS CONTAINING
FLUORINE COMPOUNDS
Martin English, Stockport, England, assignor to L. A. Mitchell Limited, Manchester, England
Filed Apr. 25, 1968, Ser. No. 724,141
Claims priority, application Great Britain, May 3, 1967, 20,419/67
Int. Cl. B01d 53/00
U.S. Cl. 55—71                5 Claims

ABSTRACT OF THE DISCLOSURE

A method of recovering fluorine compounds from vapours containing water vapour and fluorine compounds comprising, the steps of scrubbing the vapours with an aqueous liquid at such a temperature as not to cause any substantial condensation of the water vapour, whereby impurities are scrubbed out of the vapours and fluorine compounds remain therein; subsequently scrubbing the vapours with an aqueous fluorine-compound-absorbing liquid at such a temperature as not to cause any substantial condensation of the water vapour, thereby removing fluorine compounds in the fluorine-compound-absorbing liquid; and recovering fluorine compounds from the said fluorine-compound-absorbing liquid.

---

The present invention relates to the purification of vapours containing fluorine compounds and to the recovery of pure or substantially pure fluorine compounds from such vapours.

According to the present invention there is provided a method of removing impurities from vapours containing water vapour and fluorine compounds and impurities and produced in the concentration of dilute phosphoric acid, comprising scrubbing the vapours with an aqueous solution of fluosilicic acid containing an amount of fluosilicic acid in excess of 30% by weight as $H_2SiF_6$, at a temperature sufficiently elevated to avoid any substantial condensation of the water vapour, said impurities being scrubbed out of the vapour by dissolving in said solution of fluosilicic acid, and said fluorine compounds remaining undissolved.

The invention also provides a method of recovering fluorine compounds from vapours containing water vapour and fluorine compounds and impurities and produced in the concentration of dilute phosphoric acid, comprising scrubbing the vapours with an aqueous solution of fluosilicic acid containing an amount of fluosilicic acid in excess of 30% by weight as $H_2SiF_6$, at a temperture sufficiently elevated to avoid any substantial condensation of the water vapour, said impurities being removed from said vapour by dissolving in said solution, and the fluorine compounds remaining undissolved, subsequently scrubbing the vapours with a second aqueous solution of fluosilicic acid containing an amount of fluosilicic acid less than 30% by weight as $H_2SiF_6$, at a temperature sufficiently elevated to avoid any substantial condensation of water vapour, said fluorine compounds being removed by dissolving into said second solution, and recovering said fluorine compounds from said solution.

Advantageously, the aqueous liquid not capable of absorbing fluorine compounds comprises an aqueous solution of fluosilicic acid containing an amount of fluosilicic acid in excess of 30% by weight, i.e., in excess of 30 parts by weight in each 100 parts by weight of solution. It is desirable that the concentration of the fluosilicic acid should not be above 70% by weight. The best range for the concentration of this fluosilicic acid is 30% to 60% by weight, preferably 40% to 50%. Further, the aqueous fluorine-compound-absorbing liquid advantageously comprises an aqueous solution of fluosilicic acid containing an amount of fluosilicic acid less than 30% by weight.

Vapours containing fluorine compounds, mainly HF and $SiF_4$, are produced in the concentration of dilute phosphoric acid manufactured by treatment of phosphate rock with a mineral acid such as sulphuric acid and the methods described above are suitable for use in purifying these vapours and recovering the fluorine compounds from them.

Normally, the dilute phosphoric acid is concentrated under vacuum and the vacuum is maintained whilst scrubbing the vapours first to purify them and then to recover the fluorine compounds. The vacuum used is commonly in the range of 5 to 29 in. mercury vacuum and in these circumstances the scrubber liquors are maintained above about 25° C. and below about 95° C. A desirable temperature for both the scrubber liquors is in the range of 25° C. and 70° C. and this temperature can be used if the vacuum in the system is maintained between about 20 and 29 in. mercury vacuum.

Apparatus for carrying out the invention and methods of operating the apparatus to recover substantially pure fluorine compounds from the vapour produced in concentrating dilute phosphoric acid will now be described by way of example of the invention.

The description will be given with reference to the accompanying drawing which comprises a flow sheet illustrating one method according to the invention.

The apparatus indicated in the drawing comprises a vacuum evaporating vessel 1 with an inlet (not shown) for dilute phosphoric acid (about 26–32% by weight $P_2O_5$), means 2 for heating the acid, an outlet (not shown) at the bottom controlled by a valve for removal of concentrated phosphoric acid and an outlet 3 at the top for vapours from the dilute acid. The concentrated phosphoric acid produced commercially in the apparatus will have a concentration of about 54% by weight $P_2O_5$ and contains a smaller weight of fluorine compounds than the dilute acid. The vapours leaving the evaporating vessel via the outlet 3 at the top contain water vapour and fluorine compounds, mainly HF and $SiF_4$.

A form of entrainment separator (not shown) is included in the top of the evaporating vessel to remove large droplets of phosphoric acid. The separator can be located in a separate vessel between the evaporator and the first scrubber.

A conduit 4 is connected to the outlet 3 at the top of the evaporating vessel 1 and leads to the bottom of a first scrubber tower 5. Also connected to the bottom of the first scrubber tower is a barometric leg 6 ending in a seal box 7. A pump 8 and conduit 9 lead from the seal box 7 to spray nozzles 12 in the scrubber tower 5.

A conduit 13 leads from the top of the scrubber tower 5 to the bottom of a second scrubber tower 14 also having a barometric leg 15 ending in a second seal box 16. From the second seal box 16 a further pump 17 and a conduit 18 lead to a spray nozzle 19 in the second scrubber tower 14.

A conduit 22 leads from the top of the second scrubber tower 14 to the bottom of a third scrubber tower 23 also having a barometric leg 24 ending in a third seal box 25 and overflow 26 from which leads to waste. A spray nozzle 27 in the third scrubber tower 23 is connected to a source of condensing liquid (not shown) in this case cold water, which is supplied to the nozzle along a conduit 28 by a pump 29.

A second outlet 32 from the first seal box 7 leads to a storage tank (not shown) for dilute phosphoric acid and an overflow 33 from the second seal box 16 leads to a storage tank (not shown) for the intermediate product, a solution of fluosilicic acid containing fluorine compounds.

A reduced pressure is maintained in the apparatus by means of a vacuum pump 34 connected to the third scrubber tower 23.

Operation of the present apparatus under test conditions will now be described. In the test, dilute phosphoric acid was heated in the evaporation vessel 1 and fluosilicic acid was introduced into the vessel through a pipe 35 at a rate to give approximately 3–5% by weight of fluosilicic acid in the water vapour emerging from the vessel 1 along the pipe 4. A vacuum of between 27.5 and 28 in. mercury vacuum is maintained in the apparatus by the pump 34 and the acid in the evaporating vessel is heated to drive off water vapour. The acid was of a concentration boiling at 78–83° C. at the pressure maintained in the apparatus.

The vapour enters the first scrubber 5 at about 73–79° C. and is thoroughly washed by the first scrubber liquor which is pumped through the nozzles 12 by the pump 8. The first scrubber liquor comprises a solution of fluosilicic acid containing about 54% by weight of fluosilicic acid containing 7% by weight of phosphoric acid. The temperature of the scrubber liquor is slightly below the temperature of the vapour but is such that no substantial condensation of water vapour is brought about. The scrubber liquor is too strong a solution of fluosilicic acid to absorb any substantial proportion of fluorine compounds but washes impurities such as phosphorus peroxide out of the vapours. The vapours passing to the second scrubber tower 14 comprises water vapour, fluorine compounds and some non-condensables.

Two spray levels are provided in the scrubber tower 5, as shown.

From time to time, liquor is removed from the seal box 7 along the pipe 32 and make-up water is added to maintain the phosphoric acid concentration in the first scrubber liquor at an acceptable level, below 10–15% by weight.

In the second scrubber 14, the vapour is scrubbed with the second scrubber liquor pumped through the nozzles 19 by pump 17 and which comprises, in the present case, a solution of fluosilicic acid containing about 18% by weight of fluosilicic acid. The second scrubber liquor is at a temperature slightly below that of the vapours entering the second scrubber tower. The liquor causes no substantial degree of condensation of water vapour in the second scrubber but takes up 90–95% of the fluorine compounds in the vapour.

The vapours passing from the second scrubber tower 14 to the third scrubber tower 23 comprise water vapour, some fluorine compounds and some non-condensables. In the third scrubber tower 23, enough water at 25° C. to 30° C. is brought into contact with the vapours to condense the water vapour and the remaining fluorine compounds and the non-condensables are removed from the apparatus through the vacuum system.

In commercial operation, a proportion of the first scrubber liquor would be removed continuously from the first seal box 7 and returned to the dilute phosphoric acid tank (not shown) and make-up water would be mixed with the liquor taken from the first seal box 7 to the spray nozzles 12 in the first scrubber tower 5.

A portion of the second scrubber liquor is removed continuously from the second seal box 16 over the overflow 33 to the intermediate product storage tank (not shown) and make-up water is mixed with the liquor taken from the second seal box 16 to the spray nozzles 19 in the second scrubber tower 14.

The fluorine compounds are recovered from the intermediate product by conventional methods.

It should be noted that in the apparatus just described, the efficiency of the evaporator is increased because phosphoric acid is removed from the water vapour and returned to the storage tanks for re-evaporation. The increase in efficiency would be in the order of 0.2% which is quite significant.

The 18% fluosilicic acid product is found to contain between 0 to 150 p.p.m. (by weight) phosphoric acid. The phosphoric acid content to be expected in fluosilicic acid produced by extracting fluorine compounds from the vapours given off in the concentration of dilute phosphoric acid would be between ½% and 2% by weight. If, in the present apparatus, the first scrubbing stage is omitted, the fluosilicic acid is found to contain between 0.1% and 0.5% by weight of phosphoric acid.

The pressure in the apparatus can be maintained at from 5 to 29 in. mercury vacuum which corresponds to temperatures in the first scrubber 5 of 95 to 25° C. Preferably, in a commercial run, the temperature in the first scrubber is maintained between 50 to 55° C. Thermal insulation of the apparatus is of assistance in maintaining the correct temperature with reduced heat loss.

Since it is not possible to obtain strong solutions of fluosilicic acid (about 50% by weight) commercially, normally, a run will be begun using a comparatively weak solution of fluosilicic acid as the first scrubber liquor and this solution will initially absorb fluorine compounds until the concentration reaches an equilibrium value at which it will not absorb more fluorine compounds. The equilibrium concentration will depend on the pressure maintained in the apparatus and at the pressure normally maintained in the apparatus of 27.5 to 28 in. of mercury vacuum, the equilibrium concentration will be approximately 52 to 54% by weight of fluosilicic acid. Under a pressure of 28.5 in. of mercury vacuum in one test run, the equilibruim concentration of the fluosilicic acid was maintained at 42% by weight of fluosilicic acid for some hours.

In one test run in which a comparatively weak solution of fluosilicic acid was used initially, the fluosilicic acid concentration in the first scrubber liquor was initially 36.4% by weight and increased during the run to 52.8%. The phosphoric acid concentration in the first scrubber liquor remained at 1.7% by weight, because liquor was continuously removed taking phosphoric acid with it. The $P_2O_5$ content of the fluosilicic acid recovered was always less than 100 p.p.m. by weight.

In this test run, conditions were not strictly in accordance with the present invention in that an appreciable quantity of water vapour was condensed in the first scrubber tower during the build-up of the fluosilicic acid concentration and the resultant increase in the volume of the first scrubber liquor made it necessary to remove a proportion of this liquor continuously as described. However, this test does illustrate the low values of $P_2O_5$ content in the fluosilicic acid recovered which can be attained by the process of the present invention since modification of this test to bring it into accordance with the invention will not affect its efficiency as a method of removing phosphoric acid.

I claim:

1. A method of recovering fluorine compounds from vapours containing water vapour and fluorine compounds and produced in the concentration of dilute phosphoric acid comprising the steps of:

scrubbing the vapours with an aqueous solution of fluosilicic acid containing 30 to 70% by weight fluosilicic acid at such a temperature as to avoid any substantial condensation of the water vapour for the removal of the phosphorus peroxide with the fluorine compounds remaining therein;

subsequently scrubbing the vapours with an aqueous solution of fluosilicic acid containing an amount of fluosilicic acid less than approximately 30% by weight at such a temperature as not to cause any substantial condensation of water vapour for the removal of the fluorine compounds;

and recovering the fluorine compounds from the aqueous solution.

2. A method of removing impurities from vapours containing water vapour and fluorine compounds and impurities, comprising the steps of:

scrubbing the vapours with an aqueous solution of fluosilicic acid containing an amount of fluosilicic acid in excess of 30% by weight as $H_2SiF_6$ at a temperature sufficiently elevated to avoid any substantial condensation of the water vapour with the impurities being dissolved by the solution and the fluorine compounds remaining undissolved; and thereafter recovering the fluorine compounds from the scrubbed vapors.

3. A method of recovering fluorine compounds from vapours containing water vapour and fluorine compounds and impurities comprising the steps of:

scrubbing the vapours with a first aqueous solution of fluosilicic acid containing an amount of fluosilicic acid in excess of 30% by weight as $H_2SiF_6$ at a temperature sufficiently elevated to avoid any substantial condensation of the water vapour with the impurities being removed from the vapours by dissolving in the first solution and with the fluorine compounds remaining therein;

subsequently scrubbing the vapours with a second aqueous solution of fluosilicic acid containing an amount of fluosilicic acid less than 30% by weight as $H_2SiF_6$ at a temperature sufficiently elevated to avoid any substantial condensation of the water vapour with the fluorine compounds being removed from the vapours by dissolving in the second solution; and recovering the fluorine compounds from the second solution.

4. A method according to claim 1 wherein the first solution contains an amount of fluosilicic acid within the range of 30% to 70% by weight as $H_2SiF_6$.

5. A method according to claim 1 wherein the first solution contains an amount of fluosilicic acid within the range of 40% to 50% by weight as $H_2SiF_6$.

References Cited

UNITED STATES PATENTS

| 3,091,513 | 5/1963 | Parish | 23—153 |
| 3,258,308 | 6/1966 | Peterson et al. | 23—88 |
| 3,415,039 | 10/1968 | Rushton et al. | 55—71 |

REUBEN FRIEDMAN, Primary Examiner

C. N. HART, Assistant Examiner

U.S. Cl. X.R.

23—88; 55